United States Patent [19]
Roberts

[11] Patent Number: 5,506,919
[45] Date of Patent: Apr. 9, 1996

[54] CONDUCTIVE MEMBRANE OPTICAL MODULATOR

[75] Inventor: David A. Roberts, Rochester, N.Y.

[73] Assignee: Eastman Kodak Company, Rochester, N.Y.

[21] Appl. No.: 411,035

[22] Filed: Mar. 27, 1995

[51] Int. Cl.$^6$ ........................................................ G02F 1/01
[52] U.S. Cl. ...................................... 385/1; 385/2; 385/23
[58] Field of Search ...................................... 385/1–10, 23

[56] References Cited

U.S. PATENT DOCUMENTS

| | | | |
|---|---|---|---|
| 3,985,423 | 10/1976 | Tseng | 385/23 |
| 4,471,474 | 9/1984 | Fields | 367/149 |
| 4,505,539 | 3/1985 | Auracher et al. | 350/96.15 |
| 5,024,500 | 6/1991 | Stanley et al. | 350/96.15 |
| 5,091,983 | 2/1992 | Lukosz | 385/13 |
| 5,278,925 | 11/1994 | Boysel et al. | 385/14 |
| 5,327,511 | 7/1994 | Helsmann et al. | 385/1 |
| 5,371,817 | 12/1994 | Revelli et al. | 385/44 |
| 5,448,665 | 9/1995 | Kershaw et al. | 385/1 |

OTHER PUBLICATIONS

T. Findakly, Glass Waveguides by Ion Exchange: A Review, Optical Engineering, Mar./Apr. 1985, vol. 24, No. 2, pp. 244–250.
"A Mechanical Anti–Reflection Switch for Fibre–to–the–Home", J. A. Walker, K. W. Goosen, and S. C. Arney, UNY–VAC 1994 Annual Sep. Symposium.
"Measurement of the Mechanical Properties of Silicon Microresonators", L. M. Zhang, D. Uttamchandani, and B. Culshaw, Sensors and Acutators A, 29 (1991) pp. 79–84 Apr.
"Investigations on Free–standing Polysilicon Beams in View of their Applications as Transducers", C. Linder and N. F. DeRooij, Sensors and Actuators, A21–A23 (1990) pp. 1053–1059 No Month.
"Silicon as a Mechanical Material", K. E. Petersen, Proc. of the IEEE, vol. 70, No. 5, May 1982, pp. 420–457.
"Silicon Micro–machining for Micro–sensors and Micro–actuators", Benecke, W., Micro–electronic Eng., 11 (1990) 73–82 No Month.
W. Lukosz and P. Pliska "Integrated Optical Interferometer as a Light Modulator and Microphone", Sensors and Actuators A, 25–27 (1991), pp. 337–340 No Month.
W. Lukosz and W. Gabathuler, "Electro–Nanomechanically Tunable Integrated–Optical Bragg Reflectors", Integrated Photonics Research,1993 Technical Digest Series vol. 10, Mar. 22–24, 1993, Palm Springs, Calif., USA, pp. 484–487.
"MOS Rib Waveguide Polarizers", F. K. Reinhart, J. C. Shelton, R. A. Logan, and B. W. Lee, Appl. Phys. Lett., 36(4), 15 Feb. 1980 pp. 237–240.

Primary Examiner—John D. Lee
Assistant Examiner—Phan T. H. Palmer
Attorney, Agent, or Firm—Raymond L. Owens

[57] ABSTRACT

An optical waveguide modulator for modulating an optical beam is described. The modulator includes a substrate and a waveguide formed in or on the substrate. A plurality of conductive membranes which define an array each being effective in a first position to be spaced from the waveguide and located along the waveguide, and in a second position to be closer to or to engage the waveguide so that when in the second position, the optical absorption properties of the waveguide changes.

3 Claims, 7 Drawing Sheets

CONDUCTIVE MEMBRANE OPTICAL MODULATOR

FIELD OF THE INVENTION

The present invention relates to waveguides which can modulate the intensity of an optical beam.

BACKGROUND OF THE INVENTION

In optical communications systems information is transmitted by imparting temporal phase, frequency or intensity variations on an optical signal. The preferred form of modulation is governed by physical factors which include the type of the radiation source and the bandwidth of the communication system and economic factors such as the total system cost and the perceived number of units required.

From the perspective of overall cost the optical communications systems used by the telecommunications industry have the advantage that the capital cost burden of the system is shared by many subscribers. The expense of the materials, the fabrication process, and the packaging process are not necessarily the dominant concern for the system designer. The maturation and proven reliability of the systems and components developed for the telecommunications industry has however led to a number of new applications from a broader base of industries. In many of these newer applications it is desired to deliver products that utilize optical components to the home and office. In this environment the unit manufacturing cost of the discrete components becomes a critical factor in determining the viability of the product. Consequently severe constraints are imposed on the design and on the cost of the materials and technology employed.

The desk top printing and publishing business is one such application where the product design is driven by the need to minimize the total system cost. U.S. Pat. No. 5,371,817 issued Dec. 6, 1994 to Revelli et al describes a page scanning device whereby a single laser spot is divided into an array of individually addressable pixels through the use of branched single mode waveguides. As described by Revelli et al, the intensity of the radiation at each output pixel is controlled by an integrated optical waveguide modulator. The materials used to construct the page scanner are required to be inexpensive because the width of the recording media often exceeds eight inches. This precludes most of the commonly used electro-optic materials. A further requirement is that, in order to produce high quality hard copy of pictorial digital images, it is usually necessary for the printing device to be capable of defining at least 256 discrete tonal shades. Fewer output levels will normally cause artifacts which will reduce the overall image quality.

The limitations that are imposed on the design of integrated optical circuits by the need to use electro-optic materials is well known and has inspired research aimed towards the realization of an inexpensive optical modulator. With the advancement in the techniques used to process silicon there has been increasing interest in devices that utilize some form of micro-machining and micro-mechanical actuation to achieve the desired optical modulation: "Silicon as a Mechanical Material", K. E. Petersen, Proc. of the IEEE, Vol 70, No. 5, May 1982, pp. 420–457; and "Silicon Micro-machining for Micro-sensors and Microactuators", Benecke, W., Micro-electronic Eng., 11 (1990) 73–82. For example, U.S. Pat. No. 4,505,539 issued Mar. 19, 1985 to Auracher et al describes a device whereby the radiation propagating in a gap between two waveguides is modulated by a drop of liquid material. The liquid was moved into and out of gap by mechanical, electrical or magnetic forces. In another device, U.S. Pat. No. 5,024,500 issued Jun. 18, 1991 to Stanley et al, radiation from an input waveguide is switched between two output waveguides by the motion of a reflective micro-mechanical cantilever beam.

The application of micro-mechanics to the problem of optical modulation has been investigated extensively by W. Lukosz and P. Pliska: "Integrated Optical Interferometer as a Light Modulator and Microphone", Sensors and Actuators A, 25–27 (1991), pp. 333–340; U.S. Pat. No. 5,091,983 issued Feb. 25, 1992 to Lukosz; and W. Lukosz and W. Gabathuler, "Electro-Nanomechanically Tunable Integrated-Optical Bragg Reflectors", Integrated Photonics Research, 1993 Technical Digest Series Vol. 10, March 22–24, 1993, Palm Springs, Calif., USA, pp. 484–487. In U.S. Pat. No. 5,091,983, optical modulation is effected by inducing a near loss less change in the phase of the guided optical modes. This change in phase is then transformed into an intensity modulation by combining the phase shifted beam with a reference beam in a Mach-Zehnder interferometer or through the interference of two orthogonally polarized guided modes. The phase change is achieved by varying the thickness of an air gap located between the waveguide and a phase shifting element. The phase shifting element generally sits astride the waveguide and is moved through the application of mechanical, piezoelectric or electric forces.

A change in the phase and intensity of a mode propagating in an optical waveguide can also induced by changing the complex part of the propagation constant. In U.S. Pat. No. 5,278,925 to Boysel et al, a micromechanical membrane, made from a conductive medium, is used to effect a change in the absorptive properties of the optical waveguide. Boysel et al also disclosed a periodic array of conductive membrance modulators.

In U.S. Pat. No. 4,471,474 to Fields, a change of intensity is induced through a complex change in the propagation constant of a guided optical mode. However, the device described by Fields does not readily facilitate the fabrication of a plurality of modulators of varying length on a common substrate and is not therefore suitable for applications where a large number of channels and discrete output levels are required. In the device described by Fields the phase shifting media and the optical waveguide are formed on separate substrates and are then packaged in such a way that the phase shifting media is suspended above the optical waveguide.

SUMMARY OF THE INVENTION

It is an object of the present invention to provide a more effective optical device which will provide a number of discrete levels of optical power at its output.

Another object is to provide a device which is extremely versatile in that it may be applied to a wide range of optical waveguide material systems including those which are not intrinsically electro-optic.

The above objects are achieved by a waveguide optical modulator, comprising:

a) a substrate;

b) a waveguide formed in or on the substrate; and c) a plurality of conductive membranes which define an array wherein each membrane is effective in a first position to be spaced from the waveguide and located along the waveguide, and in a second position to be closer to or to engage the waveguide so that when in the second position, the optical absorption properties of the waveguide change, the individual conductive membranes being arranged along the length of the waveguide and have a distribution of lengths designed to produce a number of discretely addressable optical output levels when a sequence of the membranes of the array are electronically energized.

Advantages

This invention is particularly advantageous in applications where a large number of discrete output levels are required and where minimizing the total system cost is paramount. An array of such modulators is ideally suited for use in systems where the aim is to produce hard copy of high quality digital images. Because the modulation is effected by the attenuation arising from the presence of the conductive membrane, the device can be expected to have a broad operating bandwidth. This is in contrast to devices based on the interferometric detection of a real phase shift which require a wavelength stabilized radiation source and tight control of the device's physical dimensions and effective refractive indices.

The conductive membrane modulator is a robust and versatile solution to the problem of fabricating a low cost, broad band optical modulator. This invention is extremely versatile in that it can be applied over a broad range of the electromagnetic spectrum and to a wide range of optical waveguide systems including those which are not intrinsically electro-optic. This permits the designer of active integrated optical circuits to use material systems which would normally be considered passive and unsuitable for making active devices such as optical modulator structures. By making full use of well established materials and processing techniques the device is expected to be inexpensive to manufacture with a high production yield.

The ease by which arrays of conductive membrane modulators are fabricated along the length of a waveguide or an array of waveguides affords the opportunity to precisely define the output characteristics of such an array. This provides a structure whereby the output characteristics of the modulator can be well matched to the sensitometric response of the media used to record an image and thereby achieve the optimum tone reproduction.

DETAILED DESCRIPTION OF THE PREFERRED EMBODIMENTS

Figure 1:
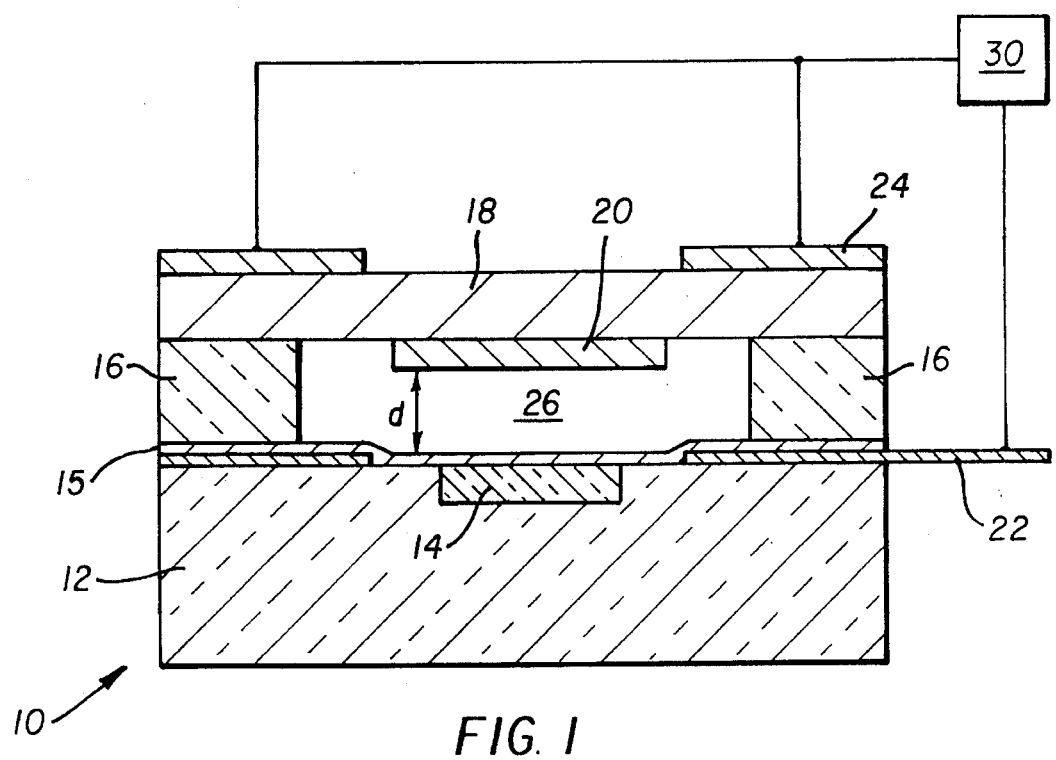
FIGS. 1 and 2 are cross-sectional views of a conductive membrane optical modulator respectively shown in first and second positions.
Figure 2:
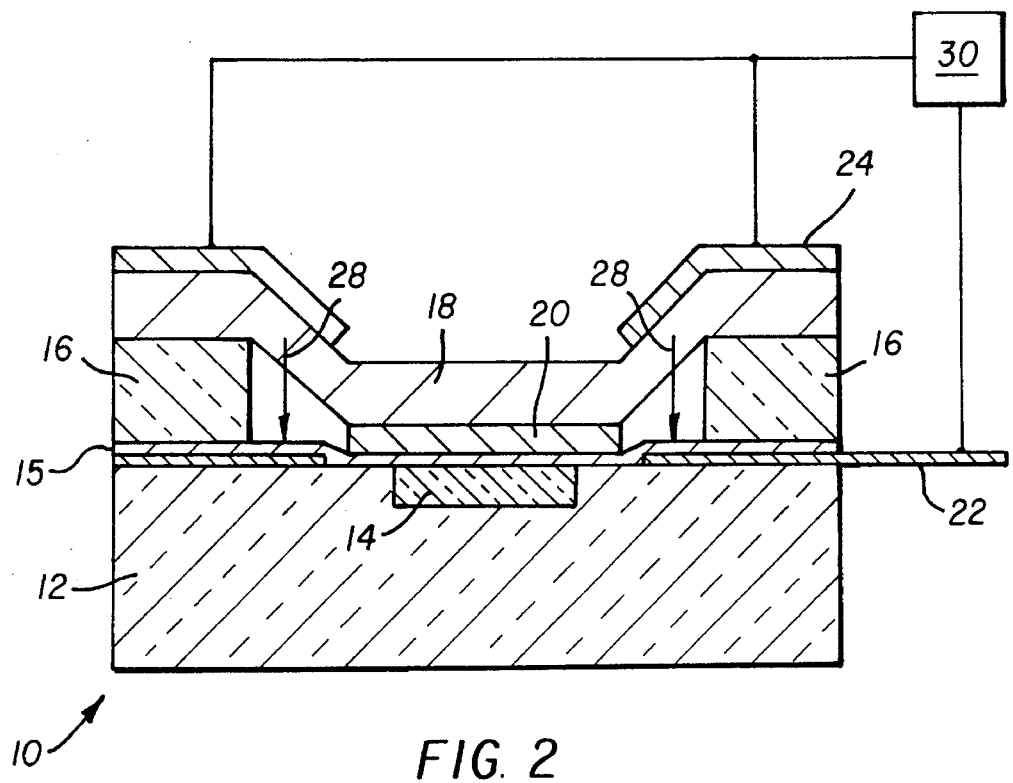

Turning first to FIGS. 1 and 2 where there is shown a conductive membrane modulator 10, respectively in first and second positions. In these FIGS., there is provided a substrate 12 which is typically made of a glass that contains an ion exchange species. Examples of suitable glass materials include Schott type BK7 or Schott type BGG36 or Corning pyrex. As is conventional, the substrate 12 is coated with a metal (not shown) and is etched to delineate openings in the metal through which a conventional waveguide 14 is defined. The waveguide 14 is formed by increasing the refractive index of the material exposed by the openings in the metal mask. This is accomplished by means of the ion-exchange diffusion process which is well known in the art. See, for example, T. Findakly, Glass Waveguides by Ion Exchange: A Review, Optical Engineering, March/April 1985, Vol. 24, No. 2, pp. 244–250. FIG. 1 shows a conductive membrane modulator 10 constructed over the waveguide 14 (sometimes referred to as a channel waveguide) fabricated by the ion-exchange process. Although a diffused channel glass waveguide is shown in FIG. 1 the principles that facilitate the operation of the conductive membrane modulator 10 are more generally applicable to a range of waveguide configurations including those defined as being ribs, strip loaded, embossed and diffused and to waveguides constructed on substrates other than glass including silicon, sapphire, silicon carbide, gallium arsenide and indium phosphide. All of which are well understood in the art.

The conductive membrane modulator 10 is constructed so that it can be moved from the first position, shown in FIG. 1, to the second position, shown in FIG. 2. In the first position the conductive membrane 20 is separated from the waveguide 14 by a finite gap 26. Electrodes 22 and 24 are provided and disposed so as to facilitate the movement of the conductive membrane 20 between the first and second positions. In a preferred embodiment, this is accomplished by using standard photolithography and thin film deposition techniques to define the lower electrode 22. The lower electrode 22, the substate 12 and the waveguide 14 are then coated with a protective overcoat layer 15 of tantalum pentoxide. The preferred characteristics of the protective overcoat layer 15 am:

a) it should effectively withstand the action of the wet chemical etchants which are used later in the processing sequence; and b) it should be optically transparent; and c) its thickness and refractive index must not adversely effect the characteristics of the guided optical mode, i.e. it should be thin enough to prevent the onset of multimode propagation in the waveguide 14.

For conductive membrane modulators constructed on glass substrates a 0.08 μm thick layer of sputtered or evaporated tantalum pentoxide is used as a protective overcoat layer 15 to prevent the wet chemical etchant from attacking the substrate 12 and the waveguide 14.

A 0.5 μm to 1.0 μm thick, planar spacer layer 16 of silicon dioxide is then deposited on top of the protective overcoat layer 15 by either sputtering or thermal evaporation. Standard photolithography is used to delineate the conductive membrane 20. The conductive membrane 20 is made from a metal or a combination of metals, e.g. gold and chrome, or a conductive metal oxide such as indium tin oxide. Typically 0.2 μm of the conducting medium is deposited by sputtering or evaporation.

The spacer layer 16 and the conductive membrane 20 are then coated with a layer of tantalum pentoxide which will ultimately provide mechanical support for the conductive membrane 20. The optimum thickness for this membrane support 18 is determined by the need to maintain mechanical rigidity while minimizing the drive voltage of the modulator. Typically between 0.3 μm and 1.5 μm of tantalum pentoxide have been deposited. The top electrode 24 is delineated by photolithography and by thermal or electron beam evaporation. The electrodes 22 and 24 are made from a metal or combination of metals. Typically a combination of metals is used such as titanium or chrome, to promote adhesion of the electrode, followed by a layer gold or aluminum. The whole structure is then coated with a 0.2 μm etch mask made from sputtered indium tin oxide.

The gap 26 is formed by the selective removal, by wet chemical etching, of the section of the spacer layer 16 that lies beneath the membrane support 18 and the conductive membrane 20. Firstly, photolithography is used to define a pattern of openings in the indium tin oxide etch mask (not shown). This pattern is transferred through to the indium tin oxide by etching in a methane plasma. The photoresist is then removed by etching in an oxygen plasma. Openings in the membrane support 18 are made by etching the exposed regions of tantalum pentoxide with a freon 14/oxygen plasma. The exposed silicon dioxide is then etched using a wet chemical etchant. Experiments have shown that sputtered silicon dioxide can be selectively etched using General Chemical's Class 10 6:1 BOE etchant for times in excess of forty minutes without any appreciable deterioration of the tantalum pentoxide membrane support 18. Further experiments have shown that evaporated films of silicon dioxide and tantalum pentoxide can also be used but with the added advantage that evaporated silicon dioxide etches faster than sputtered silicon dioxide. Using the BOE etchant the silicon dioxide is etched until it has been completely removed from the region beneath the conductive membrane 20.

The materials used to construct the spacer layer 16 and the membrane support 18 must be chosen so that they can be etched selectively. Alternatives to the tantalum pentoxide/silicon dioxide combination have been used by other workers in the field including silicon nitride with silicon dioxide or aluminum as described in "A Mechanical Anti-Reflection Switch for Fibre-to-the-Home", J. A. Walker, K. W. Goosen, and S. C. Arney, UNY-VAC 1994 Annual Symposium; silicon with boron doped silicon as described in "Measurement of the Mechanical Properties of Silicon Microresonators", L. M. Zhang, D. Uttamchandani, and B. Culshaw, Sensors and Actuators A, 29 (1991) pp. 79–84; and polysilicon with silicon dioxide as described in "Investigations on Freestanding Polysilicon Beams in View of their Application as Transducers", C. Linder and N. F. De Rooij, Sensors and Actuators, A21-A23 (1990) pp. 1053–1059.

It is well known in the art that metal clad waveguides exhibit large propagation losses. Reinhart, F. K., Shelton, J. C., Logan, R. A and Lee, B. W., "MOS Rib Waveguide Polarizers" Appl. Phys. Lett. 36(4) Feb. 15, 1980 pp. 237–240, have shown this to be especially true if the guided mode is propagating in the transverse magnetic (TM) polarization. In its first position, shown in FIG. 1, the conductive membrane modulator 10 is in its optical on-state. The gap 26 exists between the conductive membrane 20 and the waveguide 14. The thickness d, of the gap 26 is such that the conductive membrane 20 does not sample the evanescent tail of the mode propagating in the waveguide 14. Hence in the optical on-state the conductive membrane 20 does not contribute to the intrinsic propagation loss of the optical waveguide 14, i.e. to those losses which arise as a result of imperfections in the waveguide 14. Upon the application of a force 28, shown by an arrow, the conductive membrane 20 is moved nearer the optical waveguide 14 such that the thickness of the gap 26 decreases and the conductive membrane 20 samples the evanescent field of the optical mode. The applied force 28 may be derived from any number of means including mechanical, environmental (i.e. pressure or temperature), magnetic, piezoelectric or electrostatic. Preferably, in the embodiment, shown in FIG. 1 and FIG. 2, the force 28 is electrostatic and acts between the top and bottom electrodes 22 and 24, respectively. The charge on the electrodes 22 and 24 is supplied and dissipated by a conventional electronic switching circuit 30.

Figure 3:
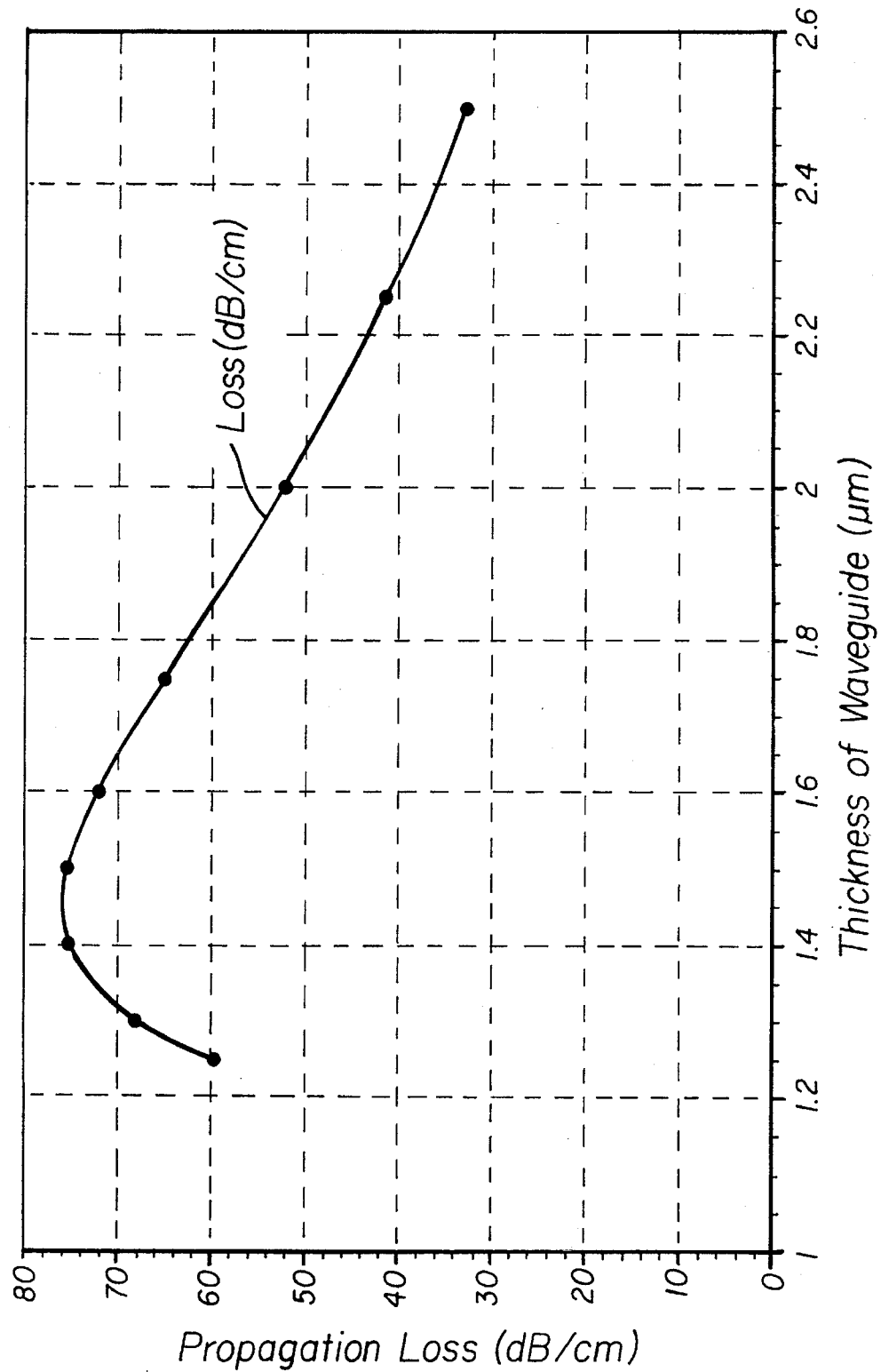
FIG. 3 is a graph of propagation loss vs. waveguide thickness for the device of FIG. 2.
Figure 4:
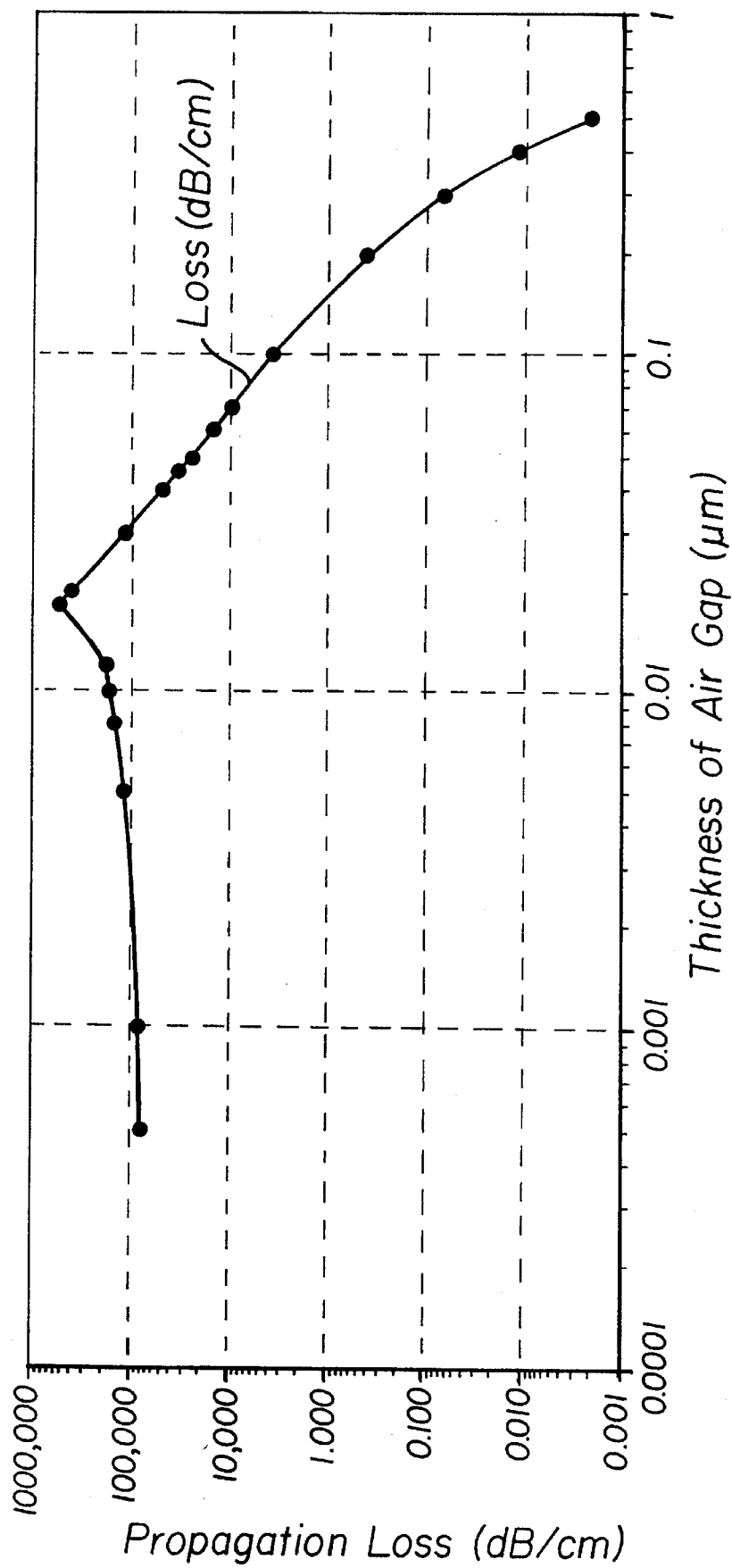
FIG. 4 is a graph of propagation loss vs. thickness of the gap as the device of FIG. 2 moves to its second position shown in FIG. 1 when the radiation propagating in the waveguide is in a transverse magnetic polarization.
Figure 5:
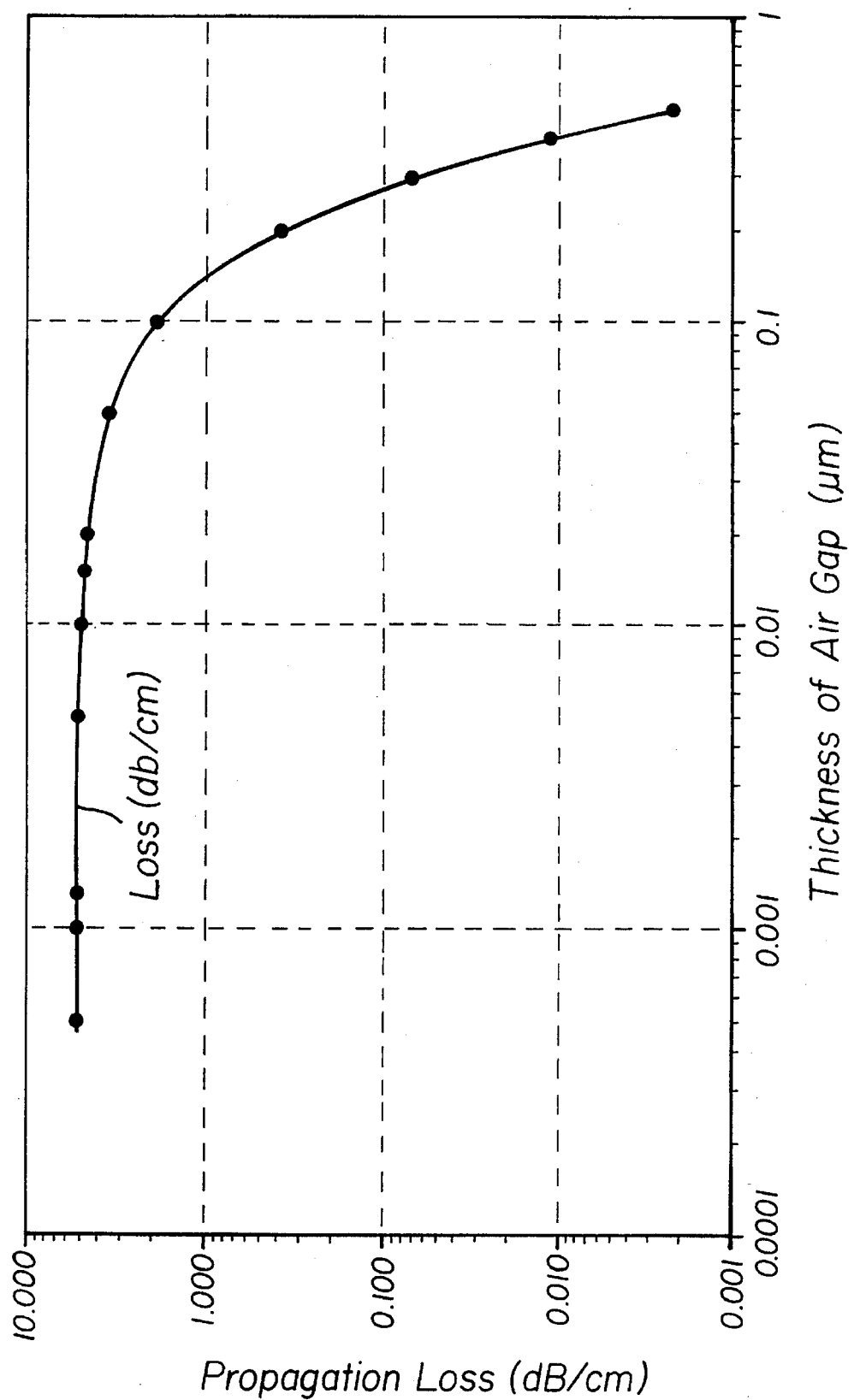
FIG. 5 is a similar graph as FIG. 4 but with radiation propagating in the transverse electric polarization.

The second position, shown in FIG. 2, represents the modulator's optical off-state. The interaction between the conductive membrane 20 and the evanescent field results in the attenuation of the guided mode as it propagates along the waveguide 14. The strength of the interaction between the conductive membrane 20 and the guided optical mode depends on the material chosen for the conductive membrane 20 and the structure of the waveguide 14. FIG. 3 shows a graph of the propagation loss for a gold coated glass waveguide which reaches a peak value of 75 dB/cm for a specific waveguide thickness of 1.5 mm. With reference to FIG. 4, if the conductive membrane 20 is now separated from the surface of the optical waveguide 14, the propagation loss for the TM mode will initially increase before decaying to zero for a gap thickness in excess of 0.5 μm In FIG. 5, a graph similar to FIG. 4 is shown for the case of propagation in the transverse electric (TE) polarized mode. Once again the attenuation rate for TE polarized modes tends towards zero for air gaps in excess of 0.5 μm thick but the peak propagation loss is substantially lower being only 5.1 dB/cm. These results indicate that the conductive membrane modulator 10 will operate more efficiently when the optical beam is propagating in the transverse magnetic polarization.

Figure 6:
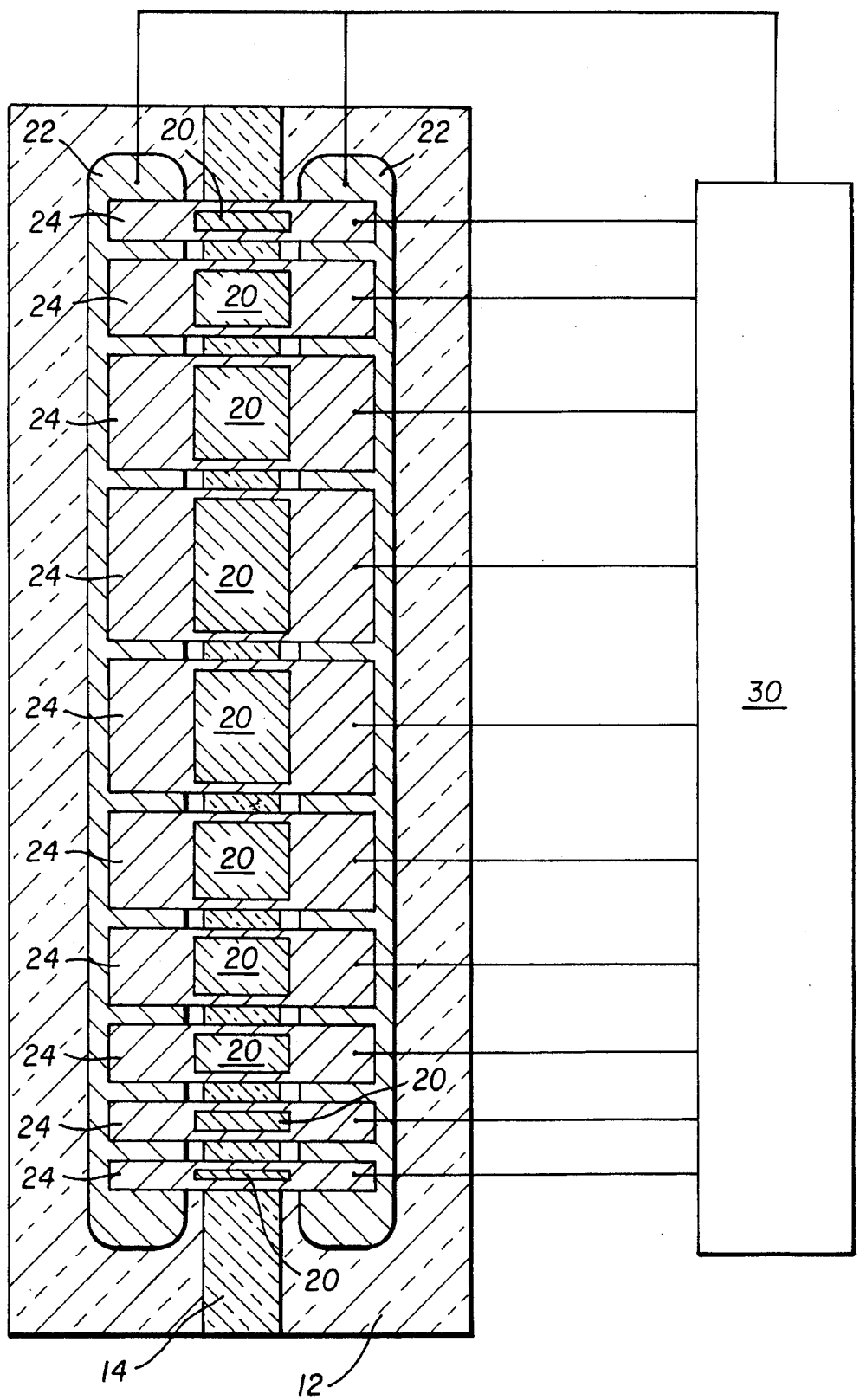
FIG. 6 shows a top schematic view of a structure which includes a plurality of conductive membrane modulators which are of similar construction to that which is shown in FIGS. 1 and 2. The membrane modulators vary in length and are spaced along the length of the waveguide.

The maximum contrast ratio attainable from a conductive membrane modulator 10 increases in proportion to the length of the conductive membrane 20. However, the penalty paid for increasing the length, and therefore the area, of the conductive membrane modulator 10 is a reduction in the maximum operating frequency due to an increase in the membranes resistive drag. This problem is overcome by constructing a plurality of shorter conductive membrane modulators 10 along the length of the waveguide 14. FIG. 6 shows a number of conductive membrane modulators 10, of varying length, define an array of modulators arranged in series along the length of the waveguide 14.

The output response of the array, shown in FIG. 6, is determined by the number of conductive membrane modulators 10 and by the lengths of the conductive membrane modulators 10. The fact that the output response is dependent on the length of the conductive membrane modulators 10 affords great flexibility in the design of the array's output characteristics. It is possible therefore to construct an array of conductive membrane modulators 10 whose output characteristics are closely matched to the sensitometric response of the media used to record the image.

Figure 7:
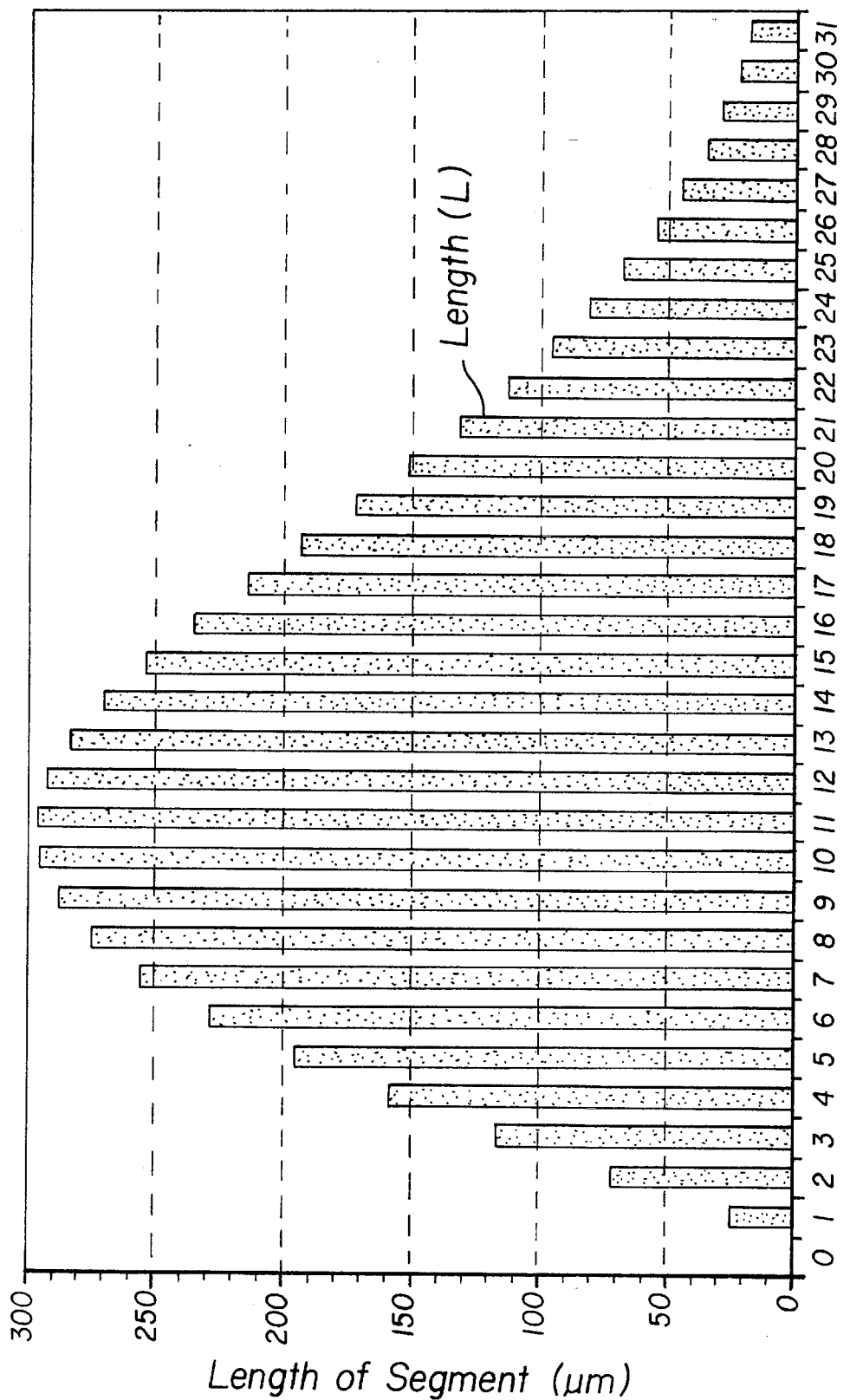
FIG. 7 shows an example of a distribution of conductive membrane lengths which is particularly suitable for use in imaging applications.
Figure 8:
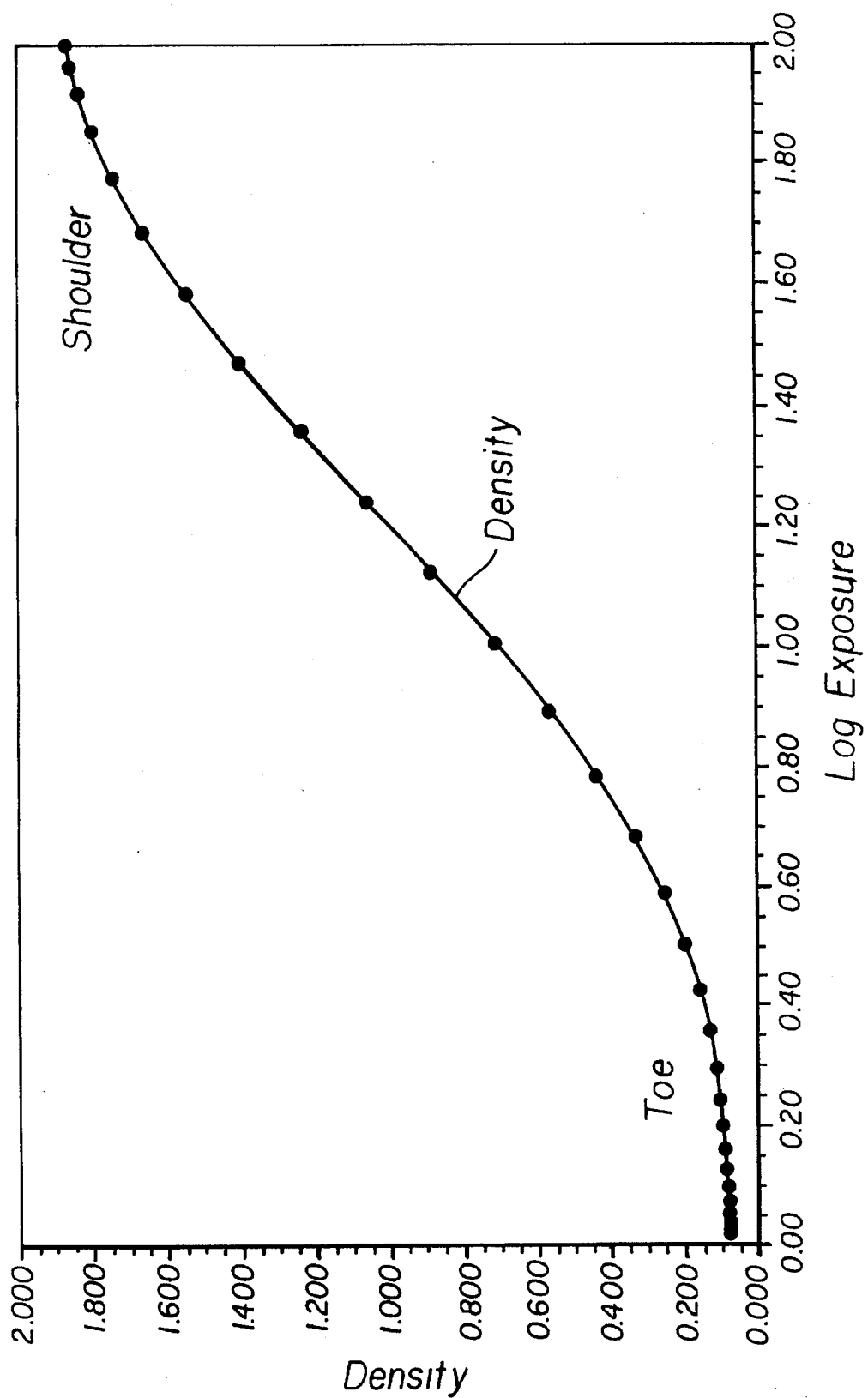
FIG. 8 is a graph of density vs. log exposure for an imaging system using the distribution of membrane lengths as shown in FIG. 7 above.

If, for example, the length of each conductive membrane modulator 10 increases exponentially, over the length of the array of modulators, the output intensity will decrease in a linear fashion as successive elements are energized. Alternatively, if all the conductive membrane modulators 10 have the same length the output will decay exponentially as the number of energized elements increases. More complex sampling functions are also advantageous. The distribution of lengths shown in FIG. 7 defines an output characteristic which results in a Gaussian sampling of the sensitometric data plotted in FIG. 8. This simple example illustrates that with the appropriate choice of sampling function it is possible to arrange for over sampling in, for example, the toe and shoulder portions of the curve and therefore to achieve better tone reproduction in the highlights and shadows of the reproduced image. Clearly this example is presented for illustrative purposes only and we would expect others skilled in the art to appreciate that through the appropriate choice of sampling function any portion of the tone reproduction curve may be over or under sampled.

The invention has been described in detail with particular reference to certain preferred embodiments thereof, but it will be understood that variations and modifications can be effected within the spirit and scope of the invention.

PARTS LIST

- 10 conductive membrane modulator
- 12 substrate
- 14 waveguide
- 15 protective overcoat layer
- 16 spacer layer
- 18 membrane support
- 20 conductive membrane
- 22 lower electrode
- 24 top electrode
- 26 gap
- 28 force
- 30 electronic switching circuit

I claim:

1. A waveguide optical modulator, comprising:

a) a substrate;

b) a waveguide formed in or on the substrate; and c) a plurality of conductive membranes which define an array wherein each membrane is effective in a first position to be spaced from the waveguide and located along the waveguide, and in a second position to be closer to or to engage the waveguide so that when in the second position, the optical absorption properties of the waveguide change, the individual conductive membranes being arranged along the length of the waveguide and have a distribution of lengths designed to produce a number of discretely addressable optical output levels when a sequence of the membranes of the array are electronically energized.

2. The waveguide optical modulator according to claim 1 wherein each conductive membrane includes a membrane which is movable between the first and second positions and wherein each conductive membrane is substantially ineffective for changing the optical absorption properties of the waveguide in its first position.

3. The waveguide optical modulator of claim 1 including means for changing the space between each conductive membrane and the waveguide.

* * * * *